March 10, 1931.  G. H. SEELY  1,796,124
TEMPERATURE CONTROLLER
Filed Nov. 30, 1927    2 Sheets-Sheet 2
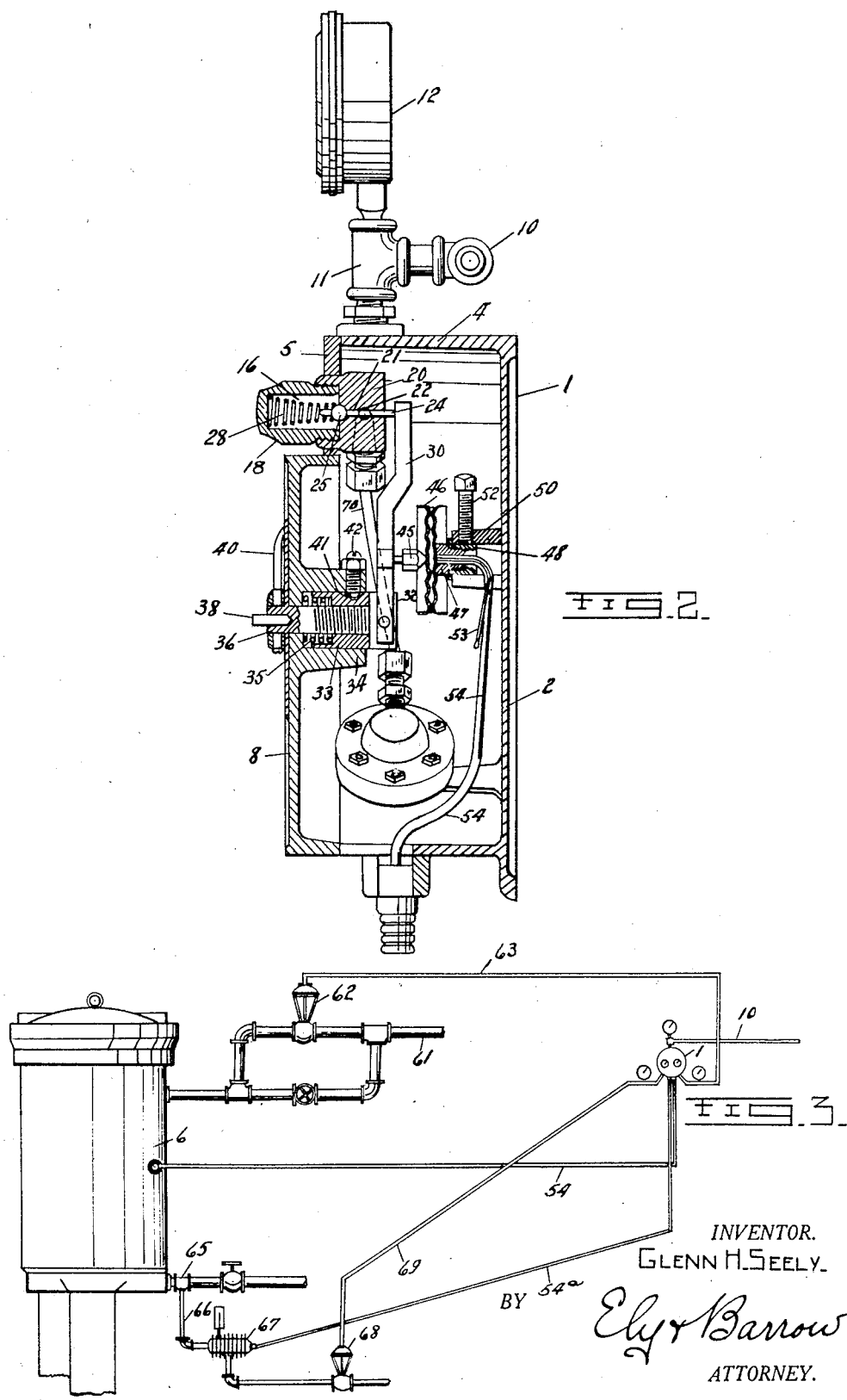
INVENTOR.
GLENN H. SEELY.
BY Ely & Barrow
ATTORNEY.

Patented Mar. 10, 1931

1,796,124

UNITED STATES PATENT OFFICE

GLENN H. SEELY, OF AKRON, OHIO, ASSIGNOR, BY MESNE ASSIGNMENTS, TO THE BRISTOL COMPANY, OF WATERBURY, CONNECTICUT, A CORPORATION OF CONNECTICUT

TEMPERATURE CONTROLLER

Application filed November 30, 1927. Serial No. 236,735.

The present invention relates to automatic controllers for regulating the supply of steam to boilers, heaters or the like, being especially adapted for connection in systems of standard types in which the steam supply and the outlet for the exhaust steam and condensate are controlled by diaphragm valves, although the principles of the invention may be employed in other systems.

The objects of the invention are to provide for the adjustment of the steam supply and exhaust within certain well defined limits, the instrument here shown permitting very accurate regulation of the temperature within the heater or boiler. The controller is so constructed that the operator cannot get it set beyond definite limits, this being a desirable result and preventing the possibility of injury to the system. It is a further object of the invention to so arrange the parts of the controller that it can be taken apart for cleaning or repairs without disturbing the adjustment of the parts. It is also an object to provide a better and more economical mounting and adjustment for the various elements of the controller.

Other objects and advantages will be derived from the improved apparatus shown and described herein, it being sufficient to state that the controller is capable of very accurate regulation and control, and yet is simple and effective in all of its parts.

In the drawings in which the preferred form of the improved device is shown, the features thereof are clearly illustrated. It will be understood, however, that the principles of the invention may be embodied in different forms and specifically different types of apparatus, within the limits of the invention as set forth in the claims.

In the drawings:

Figure 2 is a section on the line 2—2 of Fig. 1; and

Figure 3 is a diagrammatic view showing the manner in which the controller is applied to a heater.

Figure 1:
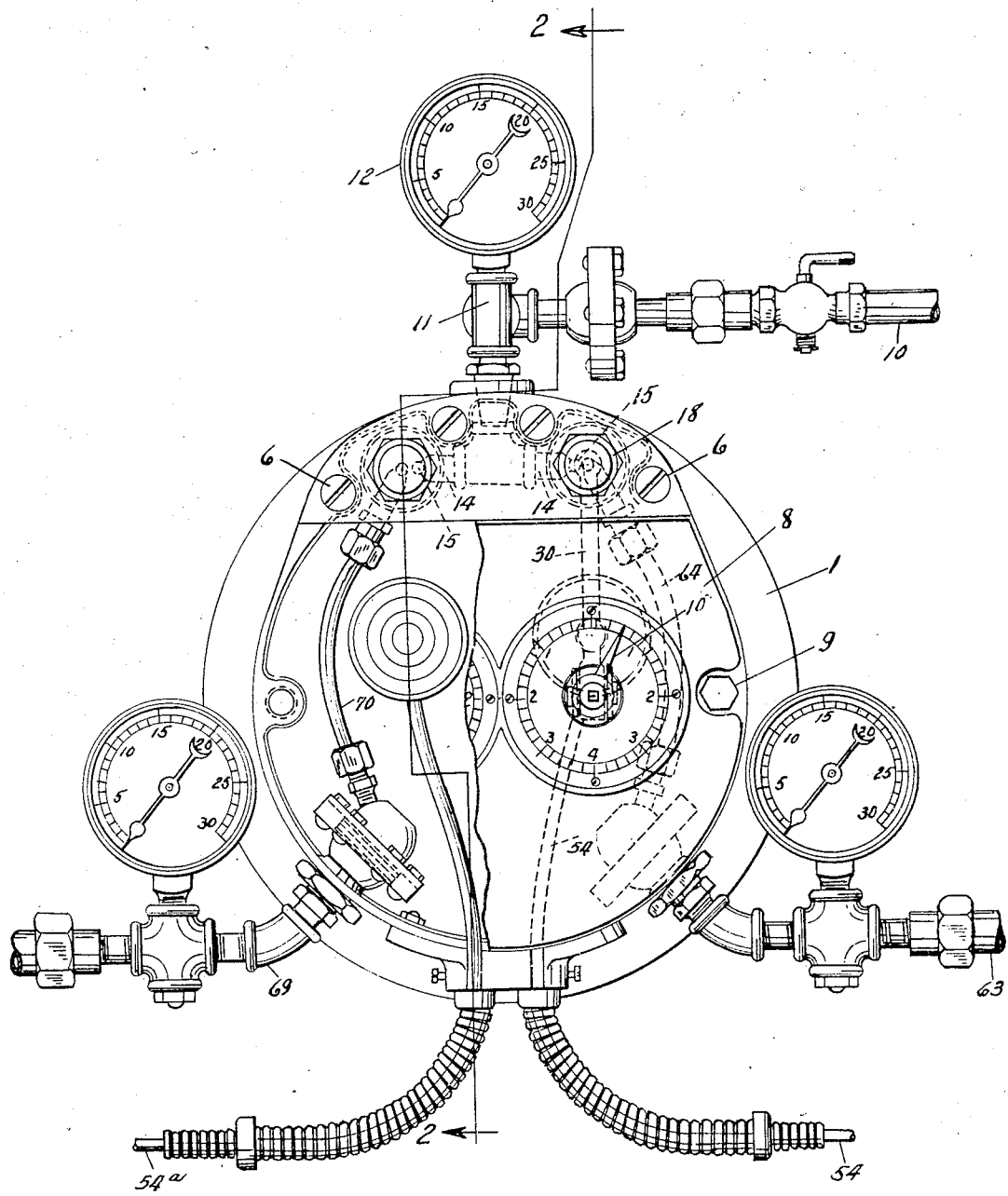
Figure 1 is a front elevation of a control unit, a portion thereof being broken away to show the internal construction.

The controller is indicated by the numeral 1, comprising two portions, one of which is a stationary casing 2 having a circular wall or flange 4. Across the upper part of the casing is secured a narrow plate 5, which is intended to be substantially permanently attached to the casing by screws 6. The other portion of the controller is a flanged plate 8, which may be removably secured to the front of the casing 2 by bolts 9.

Air under pressure, for the operation of the diaphragm valves is conducted through an air pressure line 10 which communicates through a coupling 11 in the upper part of the casing, a gage 12 being connected to the line. Interiorly of the casing the air line branches at 14 and discharges at 15 to the interior of two chambers 16, each formed in a removable plug 18, which is screw threaded into a socket formed on a valve plate 20, the latter being secured in the plate 5.

In each of the valve plates 20 is a passageway 21 which communicates with a transverse passageway 22, and in each passageway 21 is located a pin valve 24 having a ball 25 which is held in a corresponding seat in the face of the valve plate by a coil spring 28 located in the chamber 16. For a short distance behind the ball the valve stem may be grooved or squared to permit the passage of air from 16 through the passageway 21 to the outlet 22. It will be observed that should the valve become clogged through dirt, the removal of the plug 18 permits the valve stem to be lifted out of its seat so that it may be readily cleaned without disturbance of the remaining portions of the apparatus.

Each valve stem extends rearwardly of the valve plate where it contacts with the upper end of a control lever 30. The control levers are indentical on either side of the apparatus and one only will be described. Each lever is pivoted at its lower end between lugs 32 extending from the rear of a sliding bearing 33 movable longitudinally in a socket 34 formed in the rear of the plate 8 to provide a direct-acting controller. Of course, by the use of an extended lever 30 pivoted between lugs 32 and engaged with capsule 46 positioned below the pivot, a reverse-acting controller will be provided which eliminates complicated reverse-acting air valves, etc. The bearing 33 is yieldingly forced toward the rear or outwardly of the socket by a coil spring 35 and is positively moved by a screw 36, the outer end of which is provided with a stem 38 by which it may be turned. The screw is provided with a pointer 40 which travels over a dial on the face of the plate 8. For the purpose of preventing any but a limited adjustment of the bearing 33 and the parts carried thereby, one surface of the bearing is provided with a short slot 41 in which is received the lower end of a set screw 42 located in the socket 34.

At a midway point on the lever 30 is located a pin 45, this pin bearing against an expansible drum or capsular chamber 46 carried upon a stem 47 which is screw-threaded into a holder 48. This holder is adjustably mounted in a socket 50 secured to the rear wall of the casing. A set screw 52 fixes the location of the drum. This capsule is designed to expand and contract by the expansion of a fluid with which the capsule is filled after the air has been exhausted therefrom through the small tube 53. It is connected by a capillary tube 54 to a bulb located at the desired point at which the temperature is to be ascertained.

It will be observed that in operation as the capsule expands and contracts through the expansion and contraction of the liquid within the capsule, the movement thereof is transmitted to the lever 30 which will open or close the valve 25. The temperature at which the movement is to take place is controlled by the adjustment of the bearing 33, and this adjustment is necessarily confined within definite limits by the set screw 42, so that the operator can have but a definite and limited control over the range of temperature to be obtained. In this manner, the article to be treated can not be subject to injury by excessive adjustments in the range of temperature, controlled by the device. It will also be noted that when the plate 8 is removed, the levers and their adjustable bearings are removed with it, so that the controller can be opened for inspection and repair without destroying the delicate adjustments which may have been made therein.

Figure 3 shows the installation of the device as it may be made in a heater such as used in the vulcanization of tires or other rubber articles, although the invention is not confined to such a purpose. In this view the heater is indicated by the numeral 60 and the steam inlet by the numeral 61, the diaphragm valve for controlling the flow of the fluid medium through the heater being shown at 62 and the air line for controlling the valve at 63. This air line comes from the right side of the controller, as shown in Figure 1, and connects through pipe 64 with the outlet 22 on the right valve plate. The steam and condensate discharge for the heater is shown at 65, the condensate flowing through pipe 66 and into a condensate chamber 67. The diaphragm valve for controlling the discharge of the condensate and exhaust steam is indicated at 68, being controlled by air through the line 69, which is connected to the left-hand side of the controller and through the pipe 70 from the outlet 22 on the left-hand valve plate.

The temperature control for the right-hand valve is through the capillary tube 54 at the right of the controller which extends to the heater in which the bulb is located. The temperature control for the left-hand valve is through the capillary tube 54ª from the left-hand side of the controller to the condensate chamber 67 in which the bulb is located.

The system is provided with the usual pressure indicators and thermometers at suitable points and with valves also located at suitable points so that the operation of the heating system can be regulated and controlled. Air strainers are provided at points along the air lines so that the system will operate satisfactorily. The advantages of the present controller are in the ease with which the device may be taken apart and cleaned and regulated without disturbing the adjustments. The whole device is also of extreme simplicity and will not readily get out of order. The device is also arranged so that the operator has but a limited control over the heating system and cannot adjust it beyond a limited range. The capsular chamber may be responsive to either heat or pressure. The advantages and purposes of the invention may be availed of by those skilled in the art without following the details of the device as described, and the claims are intended to cover such modification and variations as fall within the scope thereof.

What is claimed is:

1. A temperature controller comprising a casing, a removable face plate on the casing, a capsular chamber in the casing, a pivoted lever on the face plate having a portion thereof bearing against the expansible side of the chamber, and a valve mechanism operated by the lever.

2. A temperature controller comprising a casing, a removable face plate on the casing, a capsular chamber on the wall of the casing opposite the face plate, an adjustable bearing on the face plate, a lever pivoted on the bearing and having a portion thereof bearing against the expansible side of the chamber, and a valve mechanism carried by the casing independently of the face plate and operable by the lever.

3. A temperature controller comprising a casing, a removable face plate in the casing, a capsular chamber on the wall of the casing opposite the face plate, an adjustable bearing on the face plate, means to limit the range of adjustment of the bearing, a lever pivoted on the bearing and having a portion thereof bearing against the expansible side of the chamber, and a valve mechanism carried by the casing and operable by the lever.

4. A temperature controller comprising a casing, a removable face plate on the casing, a capsular chamber on the wall of the casing opposite the face plate, an adjustable mounting for the chamber to move it toward or away from the face plate, a lever pivoted on the face plate and bearing against the expansible wall of the chamber, and valve mechanism operable by the lever, said face plate and lever being removable as a unit without disturbing the remaining elements thereof.

5. A temperature controller comprising a casing, a removable face plate on the casing, a capsular chamber on the wall of the casing opposite the face plate, an adjustable mounting for the chamber to move it toward or away from the face plate, a lever pivoted on the face plate and bearing against the expansible wall of the chamber, and valve mechanism operable by the lever and supported independently of the lever, said face plate and lever being removable as a unit without disturbing the remaining elements thereof.

6. A temperature controller comprising a casing, a removable face plate on the casing, a capsular chamber on the wall of the casing opposite the face plate, an adjustable mounting for the chamber to move it toward or away from the face plate, an adjustable bearing on the face plate, a lever pivoted on the bearing and contacting with the expansible side of the chamber, and valve mechanism on the casing operable by the lever, said face plate and lever being removable as a unit without disturbing the remaining elements thereof.

7. A temperature controller comprising a casing, a face plate on the casing, an adjustable bearing on the face plate, means to limit the extent of adjustment of the bearing, a pivoted lever on the bearing, a valve on the casing movable by the lever, and an expansible element secured to the casing independently of the face plate and cooperating with the lever.

8. A temperature controller divided into two separable portions, a capsular chamber and a fluid valve on one of said portions and a lever on the other portion, the said portions when assembled being so arranged that the lever contacts with the capsular chamber and with the valve to operate the latter in accordance with the expansion or contraction of the capsular chamber, said capsular chamber being out of contact with the fluid passing through the valve.

9. A temperature controller divided into two separable portions, a capsular chamber and a valve on one of said portions and a lever on the other portion, the said portions when assembled being so arranged that the lever contacts with the capsular chamber and with the valve to operate the latter in accordance with the expansion or contraction of the capsular chamber, and means to adjust the lever toward or from the capsular chamber.

10. A temperature controller divided into two separable portions, a capsular chamber and a valve on one of said portions, a lever on the other portion, the said portions when assembled being so arranged that the lever contacts with the capsular chamber and with the valve to operate the latter in accordance with the expansion or contraction of the capsular chamber, and means to adjust the relative positions of the lever and the capsular chamber.

11. A temperature controller divided into two separable portions, a capsular chamber and a valve on one of said portions, a lever on the other portion, the said portions when assembled being so arranged that the lever contacts with the capsular chamber and with the valve to operate the latter in accordance with the expansion or contraction of the capsular chamber, and means to adjust the capsular chamber and the pivot of the lever independently of one another.

12. In a temperature controller, the combination of an air line for controlling the movement of a diaphragm valve, a valve for the air line located in the controller, the valve having a stem, a lever having one end riding against an end of the stem, an expansible element located in the controller and contacting with the lever, a bearing for the lever adjustable toward or from the expansible element, and a face-plate mounting for the bearing, which face-plate, bearing and lever are removable from the controller without disturbing the remaining elements thereof.

13. In a temperature controller, the combination of a capsular chamber, a lever bearing at an intermediate point on the chamber, a mounting for the chamber adjustable toward or from the lever, a pivot for said lever adjustable toward or from the chamber, and an air valve operated by the moving end of the lever, said chamber being outside and spaced from the air passing the air valve.

GLENN H. SEELY.